Figure 1:
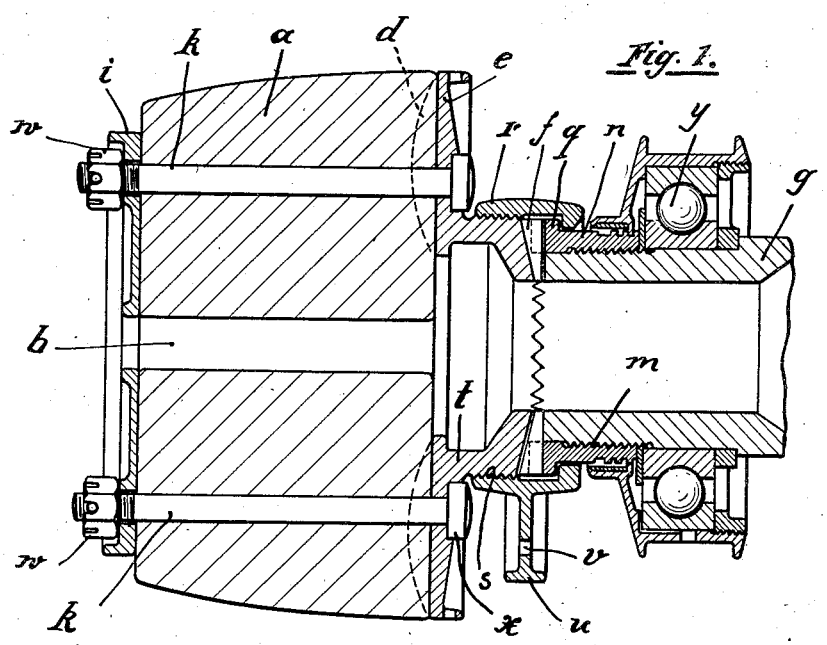

Sept. 8, 1936.  H. HIRTH ET AL  2,053,666

PROPELLER

Filed April 19, 1932

Inventors:
Hellmut Hirth
Richard Weis
by Karl Kirkoluj
Atty.

Patented Sept. 8, 1936

2,053,666

UNITED STATES PATENT OFFICE 2,053,666

PROPELLER

Hellmut Hirth and Richard Weis, Stuttgart-Zuffenhausen, Germany

Application April 19, 1932, Serial No. 606,198
In Germany March 28, 1931

1 Claim. (Cl. 170—177)

Our invention relates to propellers and more particularly to the means for fixing a propeller screw to its driving shaft.

It is an object of our invention to provide means for connecting the propeller screw to its hub in such manner that the gyroscopic balancing of the propeller is not interfered with when the propeller screw is connected to its hub.

The fixing of a wooden propeller screw to its hub and to the shaft of the engine presents particular difficulties in view of the widely differing mechanical properties of wood and metal.

A propeller screw and its hub when being kept in stock in assembled condition must form a perfectly balanced unit.

In order to ensure this, it has already been suggested to provide the hub with radial teeth penetrating into the wood of the propeller boss when the hub is mounted on the boss. However, the wood of the propeller boss opposes resistances to the entering of the teeth which vary with the relative position of the wood fibres and the teeth. Irregularities resulting from these variations may destroy the balance of the unit so that it must be rebalanced.

With a view to eliminating the drawbacks set out above, it has also been suggested to form the hub with radial ribs of wedge-like cross-section arranged in spaced relation in a circle around the axis and to form the wooden boss of the propeller screw with an equal number of radial grooves of wedge-like cross-section equally arranged in spaced relation in a circle around the axis, these grooves being machined to exactly fit the ribs on the hub. Both the ribs and the grooves are tapered towards the axis. While this prevents damaging or deformation of the wood fibres of the propeller screw and any interference with the proper relative position and the balancing of the two members when the unit is assembled, since deformation of the balanced unit might occur by unsuitably designed means for connecting it to a shaft which might also interfere with the balancing of the unit, it is an object of our invention to provide means for preventing such deformation. To this end we arrange a connecting member in coaxial relation to the propeller and the shaft, such member being preferably designed like a cap nut, with its threaded portion seated on one of the members to be connected, and its flange engaging a flange on the other member.

In the drawing affixed to this specification and forming part thereof a hub plate of the kind described and the means for connecting it to a shaft embodying our invention are illustrated diagrammatically by way of example.

In the drawing

Figure 2:
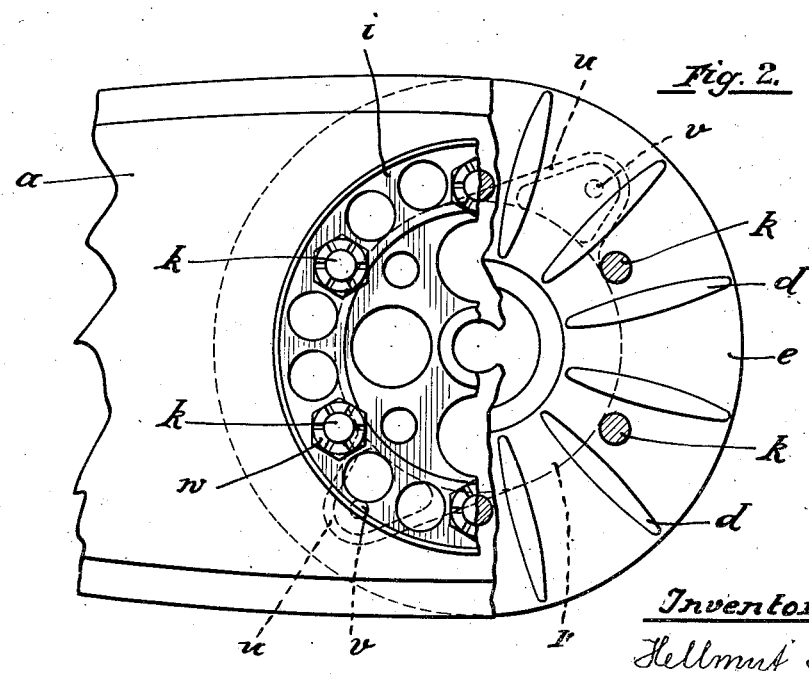

Figs. 1 and 2 illustrate the connection of the hub plate and the shaft by a member resembling a cap nut, Fig. 1 being axial section of the propeller boss, and the parts to which it is connected, while Fig. 2 is partly an elevation of the propeller boss, and partly an elevation of the hub plate, viewed from the left.

Referring now to the drawing, $a$ is the boss of the wooden propeller screw; $b$ is a centering hole in the boss; $e$ is the hub plate with radial ribs $d$ fitting radial grooves in the propeller boss $a$; $g$ is the shaft to which the hub plate $e$ is connected; $f$ are ribs or teeth on the hub plate $e$; $f'$ are corresponding grooves in the end face of the shaft $g$, and $y$ is the outer main bearing of the shaft.

The hole $b$ serves for centering the propeller screw on a milling machine of particular design in which the grooves are milled in the inner face of its boss. The grooves are arranged radially with respect to and tapered towards the axis of the propeller and are shaped in conformity with the ribs $d$ on the outer face of the hub plate $e$, which fill and cover them altogether. The ribs $d$ are wedge-shaped and their front edges are curved in conformity with the configuration of the grooves in the propeller boss. In the example illustrated the curve of the projections and grooves is an arc of a circle.

The ribs or teeth $f$ on the other side of the hub plate $e$ are also arranged radially, the depth of the gaps between them being reduced toward the axis. The mating grooves $f'$ on the outer end of the shaft $g$ shown on the right in Fig. 2 serve not only to connect the shaft $g$ to the boss of the hub plate $e$ but also to center the two members with respect to each other. The shaft members are connected by a sleeve $n$ with a flange $o$. A female thread in the sleeve $n$ engaging a male thread $m$ on the crank shaft $g$. The hub plate $e$ is fixed to the propeller boss $a$. $i$ is a washer which is preferably cut out in order to reduce its weight, as shown in Fig. 2, and is placed on the outer side of the propeller boss for distributing the pressure exerted by the bolts $k$. $w$ are nuts on the outer ends of the bolts $k$ which projects from the washer $i$. The connection between the hub plate $e$ and the shaft $g$ is effected by means arranged coaxially to the axis of the propeller and the shaft. The sleeve $n$ engaging the thread $m$ in the shaft $g$, is formed with a flange $q$, and $r$ is an annular member resembling a cap nut with a thread s engaging a corresponding thread on a tubular extension of the hub plate e. When the cap-nut r is turned it engages with its inwardly projecting flange behind the rib q so that thrust is exerted on the shaft g and the tubular extension t of the hub plate and the teeth and grooves f, f' are caused to engage uniformly and without any possibility of deformation.

The member r is preferably provided with means for engaging it with a spanner of special design. In the example illustrated it has a pair of lugs u with holes v for a hook spanner or other suitable tool to engage in. Obviously any number of lugs or any other means for turning the member r may be provided.

The ribs D are so designed that their sides fully engage the sides of the grooves c before the hub plate e takes up its final position on the propeller boss a. The bolts k do not take any part in the tangential connection of the hub plate and the propeller boss but power is transmitted exclusively through the ribs d and the grooves c.

In the manner above described the propeller and the hub disk are connected into an independent unit which is perfectly balanced.

We wish it to be understood that we do not desire to be limited to the exact details of construction shown and described for obvious modifications will occur to a person skilled in the art.

We claim:—

Means for bringing about an exact centering of a propeller on its shaft comprising a propeller and propeller shaft, a circular flange fixed to the end of said shaft, a hub plate fixed to said propeller, a threaded cylindrical extension forming part of said plate, radial teeth of wedge-like cross section tapering towards the centre point formed on the end face of said shaft and of said cylindrical extension for interlocking engagement, and an internally threaded cap nut gripping behind said flange and engaging said threaded extension to uniformly force the teeth on the shaft into the gaps between the teeth on said extension and vice versa.

HELLMUT HIRTH.
RICHARD WEIS.